(12) United States Patent
Kamizawa

(10) Patent No.: US 7,593,197 B2
(45) Date of Patent: Sep. 22, 2009

(54) ELECTRIC CIRCUIT

(75) Inventor: Koji Kamizawa, Daito (JP)

(73) Assignee: Funai Electric Co., Ltd, Daito-shi (JP)

( * ) Notice: Subject to any disclaimer, the term of this patent is extended or adjusted under 35 U.S.C. 154(b) by 216 days.

(21) Appl. No.: 11/634,978

(22) Filed: Dec. 7, 2006

(65) Prior Publication Data

US 2007/0133138 A1    Jun. 14, 2007

(30) Foreign Application Priority Data

Dec. 8, 2005    (JP)    ............... 2005-354926

(51) Int. Cl.
*H01H 9/30*    (2006.01)
(52) U.S. Cl. ............................. 361/8; 361/13
(58) Field of Classification Search ...... 361/8, 361/93.7–93.9, 103, 104, 13
See application file for complete search history.

(56) References Cited

U.S. PATENT DOCUMENTS

| | | | |
|---|---|---|---|
| 3,488,761 A * | 1/1970 | Wada et al. | 337/221 |
| 5,745,322 A * | 4/1998 | Duffy et al. | 361/45 |
| 7,268,992 B2 * | 9/2007 | Hallak et al. | 361/93.7 |
| 2004/0076021 A1 | 4/2004 | Miyamoto | |
| 2004/0156160 A1 | 8/2004 | Choo | |
| 2005/0062579 A1 | 3/2005 | Wilson | |

FOREIGN PATENT DOCUMENTS

| | | |
|---|---|---|
| EP | 0 707 377 A1 | 4/1996 |
| JP | 57-71271 A | 5/1982 |
| JP | 10-178735 A | 6/1998 |
| JP | 2000-134919 A | 5/2000 |
| JP | 2002-233142 A | 8/2002 |
| JP | 2005-49369 A | 2/2005 |

OTHER PUBLICATIONS

Extended European Search Report dated Feb. 22, 2007 (eight (8) pages).

* cited by examiner

*Primary Examiner*—Danny Nguyen
(74) *Attorney, Agent, or Firm*—Crowell & Moring LLP

(57) ABSTRACT

An electric circuit in which a combined resistance including a plurality of resistors of a small rating is disposed. The electric circuit includes a bypass section in order to allow a short-circuit current, when it occurs in the electric circuit, to intensively flow through one of the resistors in the combined resistance bypassing a remaining resistor in the combined resistance.

1 Claim, 3 Drawing Sheets

ELECTRIC CIRCUIT

BACKGROUND OF THE INVENTION

1. Field of the Invention

The present invention relates to an electric circuit.

2. Description of Related Art

A switching regulator having an electric circuit that protects predetermined resistor elements in the electric circuit from damages by leading a short-circuit current to a diode in a bypassing manner when a switching element is brought into a short-circuited condition, is known in earlier developments (refer to, for example, JP-2002-233142A: Document 1).

Furthermore, there is a technology known in earlier developments, in which a fuse is connected in series to predetermined resistor elements in an electric circuit so that the resistor elements and the circuit are protected by the fuse that will melt and blow when an abnormal, large current, such as a short-circuit current, flows in the electric circuit (Refer to JP-2005-49369A: Document 2).

However, in the case of the technology disclosed in Document 1, there was a problem that a trouble that some parts of the electric circuit are damaged may arise unless the short-circuit current is immediately interrupted by a fuse and/or a breaker provided in the circuit even though the short-circuit current is adapted to be bypassed so that it flows through the diode.

In the case of the technology disclosed in Document 2, there was also a problem that a trouble that some parts of the electric circuit are damaged by the short-circuit current if it takes time for the fuse to melt and blow due to its bad fusion characteristics. Furthermore, there was another problem that a small amount of smoke may emit when the fuse melts and blows.

SUMMARY OF THE INVENTION

The object of the present invention is to provide an electric circuit which can suppress possible circuit damages, which may be caused by a short-circuit current, to the minimum.

In order to solve the problem, in accordance with a first aspect of the invention, the electric circuit comprises a combined resistance including a plurality of resistors of a small rating disposed, wherein the combined resistance is disposed between a power supply part and a ground part in the electric circuit, and comprises a short-circuit current intensive resistor and a remaining resistor; and the electric circuit further comprises a diode connected in parallel with the remaining resistor so that a short-circuit current which occurs when a predetermined component disposed in the electric circuit is brought into a short-circuited condition, is made to intensively flow through the short-circuit current intensive resistor, to bypass the remaining resistor, and thereby to destroy the short-circuit current intensive resistor.

According to the first aspect of the invention, in the case that a short-circuit current flows in an electric circuit in which a combined resistance comprised of a plurality of small-rated resistors is disposed, a diode can lead the short-circuit current so that the latter intensively flows through either one of the resistors which comprise the combined resistance and bypasses the other resistors of the combined resistance. That is, as the diode can allow the short-circuit current to intensively flow through one specific resistor in the combined resistance in such an abnormal circumstance where the short-circuit current flows, electric energies can be intensively imposed upon said one specific resistor and, hence, said one specific resistor will be quickly destroyed through melting and/or burnout. That is, as either one of the resistors in the combined resistance can be quickly destroyed and the flow of the short-circuit current can be interrupted in the electric circuit in the abnormal circumstance where the short-circuit current flows, it is possible to reduce damages in other parts of the electric circuit except for the predetermined specific resistor. Therefore, this electric circuit can suppress possible circuit damages, which may be caused by the short-circuit current arisen in the electric circuit, to the minimum.

In particular, as the diode is connected in parallel to the resistors other than the predetermined specific resistor in the combined resistance, the short-circuit current can be made to intensively flow through the predetermined specific resistor by bypassing other resistors in the combined resistance so that the short-circuit current does not substantially flow through said other resistors.

Moreover, as the combined resistance is disposed between a power supply part and an ground (earth) part, the short-circuit current that occurs when a certain component disposed between the power supply part and the ground part is brought into a short-circuited condition can be made to flow in a concentrated manner through the predetermined one, specific resistor element in the combined resistance. Accordingly, the predetermined, specific resistor can be quickly destroyed.

Therefore, the short-circuit current arisen between the power supply part and the ground part can be more quickly interrupted.

In accordance with a second aspect of the invention, the electric circuit comprises a combined resistance including a plurality of resistors of a small rating disposed, wherein the electric circuit comprises a bypass section in order to allow a short-circuit current, when it occurs in the electric circuit, to intensively flow through one of the resistors in the combined resistance, to bypass a remaining resistor in the combined resistance.

According to the second aspect of the invention, in the case that a short-circuit current flows to an electric circuit in which a combined resistance comprising of a plurality of resistors of a small rating is disposed, a bypass section in the electric circuit can allow the short-circuit current to intensively flow through either one of the resistors in the combined resistance, so that the short-circuit current bypasses the resistors in the combined resistance other than said either one of the combined resistance.

That is, as the bypass section can lead the short-circuit current intensively to one specific resistor in the combined resistance in an abnormal condition in which the short-circuit current flows in the electric circuit, electric energies can be imposed solely upon said specific resistor and, hence, said specific resistor can be more quickly destroyed through melting and/or burnout.

In other words, as either pone of the resistors that form the combined resistance can be quickly destroyed in the abnormal condition in which the short-circuit current flows in the electric circuit and the short-circuit current can be quickly interrupted, damages of other parts of the electric circuit due to the short-circuit current, except for one specific resistor to which the short-circuit current is made to intensively flow, can be reduced. Therefore, possible damages due to the short-circuit current can be suppressed to the minimum in the case that the short-circuit current has occurred in the electric circuit.

In the second aspect of the invention, preferably, the bypass section is a diode connected in parallel with the remaining resistor.

According to the electric circuit having such a structure, the same advantages as obtained by the second aspect of the invention can be obtained and, in addition, as a bypass section in an electric circuit is a diode connected in parallel to resistors composing a combined resistance together with a specific resistor, the short-circuit current can be made to intensively flow to the specific resistor bypassing the resistors in the combined resistance other than the specific resistor, so that the short-circuit current does not substantially flow through the resistors in the combined resistors other than the specific resistor.

In the second aspect of the invention, preferably, the combined resistance is disposed between a power supply part and a ground part in the electric circuit, and a short-circuit current which occurs when a predetermined component disposed between the power supply part and the ground part is brought into a short-circuited condition, is made to intensively flow through the one of the resistors.

According to the electric circuit having such a structure, the same advantages as obtained by the second aspect of the invention can be obtained and, in addition, as a combined resistance is disposed between a power supply part and a ground (earth) part, a short-circuit current, that occurs when a predetermined component disposed between the power supply part and the ground part of the electric circuit is brought into a short-circuited condition, can be made to intensively flow to a predetermined, specific resistor in the combined resistance and, accordingly, the predetermined, specific resistor can be quickly destroyed.

Therefore, the short-circuit current that occurs between the power supply part and the ground part can be quickly interrupted in the electric circuit.

BRIEF DESCRIPTION OF THE DRAWINGS

The present invention will become more fully understood from the detailed description given hereinafter and the accompanying drawings which are given by way of illustration only, and thus are not intended as a definition of the limits of the scope of the invention, and wherein.

DETAILED DESCRIPTION OF THE PREFERRED EMBODIMENTS

Figure 1:
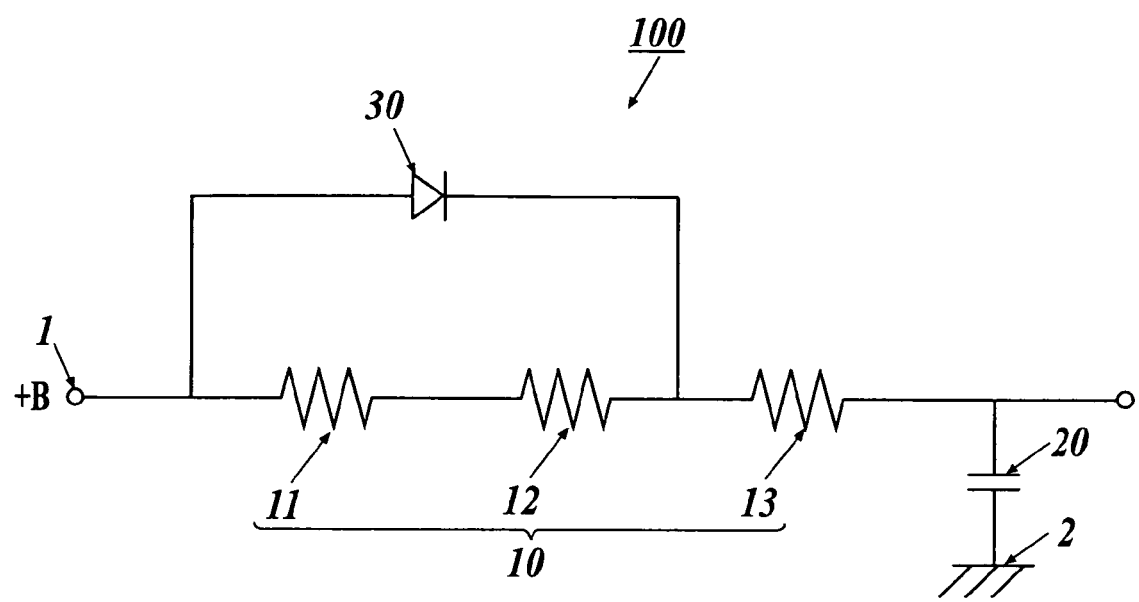
FIG. 1 is an explanatory view showing an electric circuit according to an embodiment of the invention.

One of the most preferred embodiments of an electric circuit according to the invention will be fully explained in detail hereinafter, referring to the drawings attached herewith.

FIG. 1 is an explanatory drawing showing the main circuitry of an electric circuit according to the invention.

As shown in FIG. 1, an electric circuit 100 includes a power supply part 1, a ground part 2, a combined resistance 10 disposed between the power supply part 1 and the ground part 2, a capacitor 20 as a predetermined component disposed between the combined resistance 10 and the ground part 2, and a diode 30 to form a bypass section.

The combined resistance 10 is comprised of the first resistor 11, the second resistor 12, and the third resistor 13, which are connected with each other in series.

The first resistor 11, the second resistor 12, and the third resistor 13 are carbon resistors of a small rating, and the combined resistance 10 has a resistance value combined by the resistance values of the respective resistors 11, 12 and 13.

The diode 30 is connected in parallel to a series connection of the first resistor 11 and the second resistor 12.

It would be preferable here that the voltage to be applied to the series connection of the first resistor 11 and the second resistor 12 is 0.6 (V) or less in a normal operation.

Electric power acting on the third resistor 13 of the electric circuit 100 will be explained hereunder.

Assuming that a power source voltage at the power supply part 1 is 10 [V]; each of the resistance values of the first resistor 11, the second resistor 12, and the third resistor 13 is 1 [Ω]; and a current of 0.1 [A] is flowing through each of the resistors 11, 12 and 13 in a normal operation, voltages at the respective resistors will drop by 0.1 [V] and power consumption at the third resistor 13 will be 0.01 [W] ($P=R \cdot I^2=1 \times (0.1)^2=0.01$ [W]).

On the other hand, when the capacitor 20 is short-circuited, a voltage of 10 [V] will be applied between the power supply part and the ground part, and a short-circuit current will flow through the electric circuit. In a state that the voltage drop across the first resistor 11 and the second resistor 12 is kept to a forward voltage drop of the diode 30, almost of the short-circuit current will flow through the diode 30 to the resistor 13.

That is, as the diode 30 serves as a bypass and the short-circuit current is made to flow toward the third resistor 13, with bypassing the first resistor 11 and the second resistor 12, a large electric current, namely the short-circuit current, will flow to the third resistor 13.

Therefore, for example, when the voltage drop across the diode is 1 [V] here, then a voltage of 9 [V] will be applied to the third resistor 13 and the power consumption across the third resistor 13 will be 81 [W] ($P=V^2/R=(9)^2/1=81$ [W]).

When the electric power of 81 [W] acts on the third resistor 13 of a small rating, the third resistor 13 will be instantly destroyed and the short-circuit current will be interrupted.

When the short-circuit current is interrupted due to the destruction of the third resistor 13, destroyed parts in the electric circuit 110 will be only two parts, that is, the capacitor 20 and the third resistor 13. Therefore, it is possible to minimize the breakage damages in the electric circuit.

Accordingly, even though a short-circuit occurs in the capacitor 20 in the electric circuit 100, damaged parts in the electric circuit will be only two parts, that is, the capacitor 20 and the third resistor 13.

Figure 2:
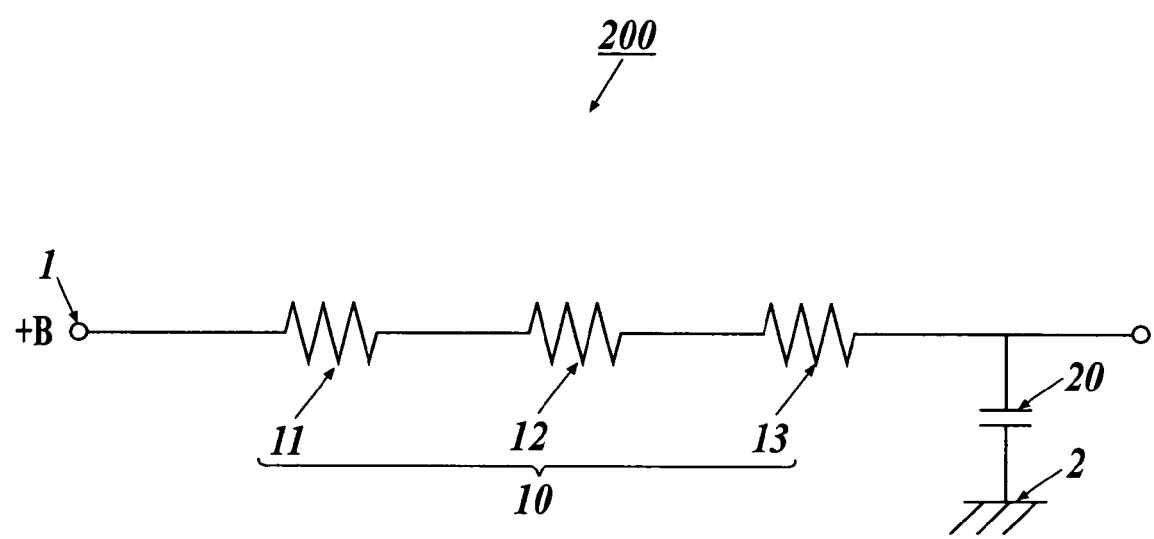
FIG. 2 is an explanatory drawing to explain an electric circuit in which a diode for a bypass is not provided.

FIG. 2 shows an electric circuit 200 which is almost the same as the electric circuit 100; shown in FIG. 1 except that no diode 30 in the electric circuit 100 is provided. In FIG. 2, the same reference numerals as those used in the electric circuit 100 shown in FIG. 1 represent the same components as those used in the electric circuit 100.

In the following paragraphs, the electric power acting on the third resistor 13 in the electric circuit 200 shown in FIG. 2, which does not have the diode 30 as used in the electric circuit 100, will be explained hereinafter.

In a normal operation of the electric circuit 200, the same electric power consumption as in the case of the electric circuit 100 described above, that is, P=0.01 [W], arises at the resistor 13.

When a short-circuit occurs in the capacitor 20 and the latter is brought into a short-circuited condition, a voltage of 10 [V] is applied across the power supply part 1 and the ground part 2 and a short-circuit current will flow in the electric circuit. Therefore, the voltage drops at each of the resistors will be 3.3 [V] and a current of approximately 3.3 [A] flows through the resistors 11, 12 and 13.

Accordingly, the power consumption of 10.9 [W] ($P=R \cdot I^2=1 \times (3.3)^2 \approx 10.9$ [W]) will arise at the resistor 13.

That is, in this electric circuit 200, when a short-circuit occurs in the capacitor 20 and then the capacitor 20 is put in a short-circuited condition, the third resistance 13 can not be instantly destroyed but generates heat, so that it will bring the electric circuit into a condition that easily causes troubles such as smoking, firing or the like, from the electric circuit.

Furthermore, as the short-circuit current equally flows through the first resistor 11, the second resistor 12 and the third resistor 13, interruption of the short-circuit current by destruction of the resistor 13 tends to be more difficult to take place, and therefore other parts of the electric circuit will possibly be damaged by the time the short-circuit current is completely interrupted.

On the other hand, the diode 30 in the electric circuit 100 can allow the short-circuit current which occurs in the electric circuit 100 to intensively flow to one specific resistor, i.e. the third resistor 13, so that the short-circuit current will be interrupted by instantly destroying the third resistor 13. Therefore, other parts in the electric circuit can be protected from damages.

In particular, as the diode 30 can make the short-circuit current flow, bypassing the first resistor 11 and the second resistor 12, to the third resistor 13 so that these resistors 11 and 12 can be protected from damages.

Accordingly, it can be said that the electric circuit 100 is one that can suppress the circuit damages which may be caused by the short-circuit current arisen in the electric circuit, to the minimum.

In addition, as the third resistor 13 is a carbon resistor and is more inexpensive than a conventional fuse resistor, it can be favorably used as a component or an element to be destroyed to protect the electric circuit 100.

Figure 3:
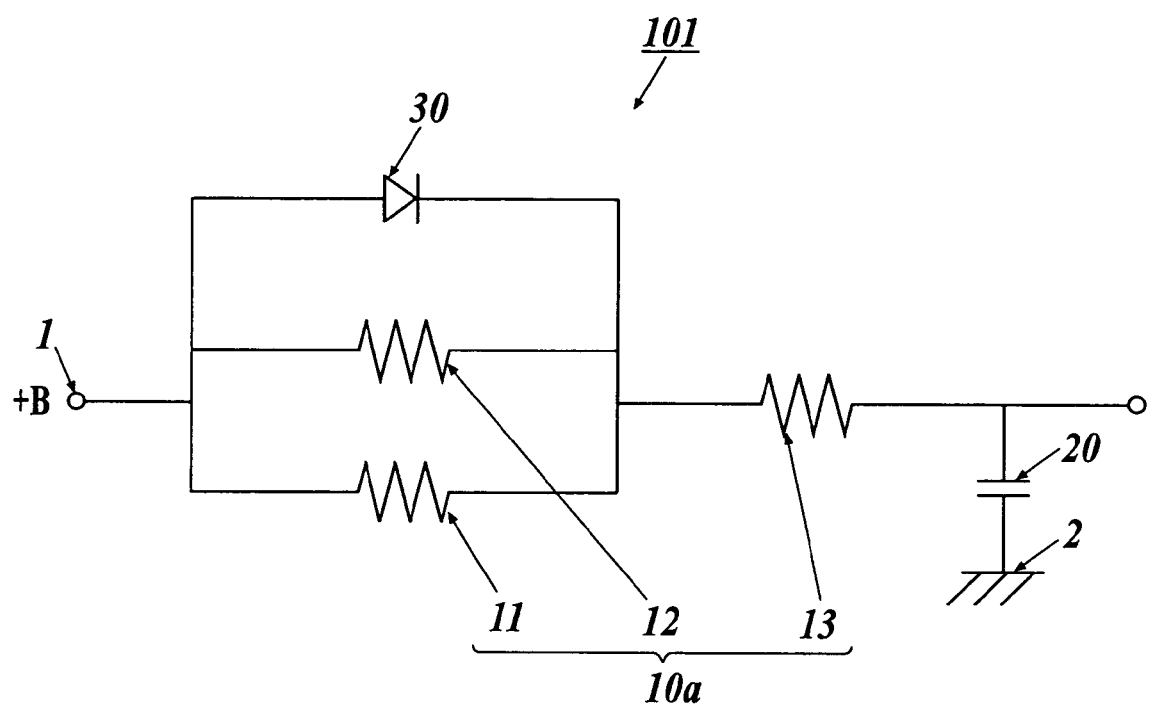
FIG. 3 is an explanatory view showing an electric circuit according to a modified embodiment of the invention.

The present invention is not limited to the embodiment as described and explained above. For example, a modified electric circuit 101 is shown in FIG. 3, in which a combined resistance 10a is comprised of the first resistor 11 and the second resistor 12 connected with each other in parallel; the third resistor 13 is connected in series to a parallel connection of the first resistor 11 and the second resistor 12; and a diode 30 is connected in parallel with a parallel connection of the first resistor 11 and the second resistor 12.

It should be noted that the adaptation of the present invention is not limited to the embodiments described and explained above and various modifications and changes may be made to each of the embodiments without departing from the scope of the present invention.

The present U.S. patent application claims a priority under the Paris Convention of Japanese patent application No. 2005-354926 filed on Dec. 8, 2005, and shall be a basis of correction of an incorrect translation.

What is claimed is:

1. An electric circuit in which a combined resistance including a plurality of resistors of a small rating is disposed,
wherein the combined resistance is disposed between a power supply part and a ground part in the electric circuit, and comprises a short-circuit current intensive resistor and a remaining resistor; and the electric circuit further comprises a diode connected in parallel with the remaining resistor so that a short-circuit current which occurs when a predetermined component disposed in the electric circuit is brought into a short-circuited condition, is made to intensively flow through the short-circuit current intensive resistor, to bypass the remaining resistor, and thereby to destroy the short-circuit current intensive resistor,
wherein the short-circuit current intensive resistor is connected in series with the remaining resistor between the power supply part and the ground part in the electric circuit.

* * * * *